US005876470A

United States Patent [19]
Abrahamson

[11] Patent Number: 5,876,470
[45] Date of Patent: Mar. 2, 1999

[54] ABRASIVE ARTICLES COMPRISING A BLEND OF ABRASIVE PARTICLES

[75] Inventor: Gerald R. Abrahamson, St. Paul, Minn.

[73] Assignee: Minnesota Mining and Manufacturing Company, St. Paul, Minn.

[21] Appl. No.: 905,488

[22] Filed: Aug. 1, 1997

[51] Int. Cl.[6] ....................................................... B24D 3/34
[52] U.S. Cl. ................................................ 51/309; 51/307
[58] Field of Search .......................... 51/307, 309, 295; 451/540; 501/152, 153

[56] References Cited

U.S. PATENT DOCUMENTS

| | | | |
|---|---|---|---|
| 2,958,593 | 11/1960 | Hoover et al. | 51/295 |
| 3,867,795 | 2/1975 | Howard | 51/209 R |
| 4,311,489 | 1/1982 | Kressner | 51/298 |
| 4,314,827 | 2/1982 | Leitheiser et al. | 51/298 |
| 4,623,364 | 11/1986 | Cottringer et al. | 51/298 |
| 4,652,275 | 3/1987 | Bloecher et al. | 51/298 |
| 4,734,104 | 3/1988 | Broberg | 51/295 |
| 4,744,802 | 5/1988 | Schwabel | 51/309 |
| 4,751,138 | 6/1988 | Tumey et al. | 428/323 |
| 4,770,671 | 9/1988 | Monroe et al. | 51/293 |
| 4,799,939 | 1/1989 | Bloecher et al. | 51/293 |
| 4,881,951 | 11/1989 | Wood et al. | 51/309 |
| 4,964,883 | 10/1990 | Morris et al. | 51/293 |
| 4,997,461 | 3/1991 | Markhoff-Matheny et al. | 51/295 |
| 5,011,508 | 4/1991 | Wald et al. | 51/293 |
| 5,039,311 | 8/1991 | Bloecher | 51/295 |
| 5,090,968 | 2/1992 | Pellow | 51/293 |
| 5,131,926 | 7/1992 | Rostoker et al. | 51/309 |
| 5,152,917 | 10/1992 | Pieper et al. | 51/295 |
| 5,164,348 | 11/1992 | Wood | 501/127 |
| 5,201,916 | 4/1993 | Berg et al. | 51/293 |
| 5,213,591 | 5/1993 | Celikkaya et al. | 51/293 |
| 5,366,523 | 11/1994 | Rowenhorst et al. | 51/293 |
| 5,435,816 | 7/1995 | Spurgeon et al. | 51/295 |
| 5,474,583 | 12/1995 | Celikkaya | 51/309 |
| 5,489,235 | 2/1996 | Gagliardi et al. | 451/527 |
| 5,496,386 | 3/1996 | Broberg et al. | 51/295 |
| 5,498,269 | 3/1996 | Larmie | 51/295 |
| 5,500,273 | 3/1996 | Holmes et al. | 428/147 |
| 5,573,619 | 11/1996 | Benedict et al. | 156/137 |
| 5,611,829 | 3/1997 | Monroe et al. | 51/309 |
| 5,645,619 | 7/1997 | Erickson et al. | 51/309 |

FOREIGN PATENT DOCUMENTS

WO 95/07797  3/1995  WIPO ........................ B24D 11/00

OTHER PUBLICATIONS

Yoon et al., Technical Paper "Use of Sintered Ceramic Aluminum Oxides in Vitrified Bonded Wheels", *Society of Manufacturing Engineers,* 1990.
Brochure 321 Cubitron™ Abrasive Grain, 1996.

*Primary Examiner*—Deborah Jones
*Attorney, Agent, or Firm*—Paul W. Busse

[57] ABSTRACT

The present invention provides an abrasive article, particularly a cut-off wheel, having a mixture of rare earth oxide modified abrasive grains and alpha alumina seeded or iron oxide nucleated abrasive grains. Preferably, the rare earth oxide is present at a level between about 0.1 wt-% to 10 wt-% of the abrasive grain, based on a theoretical oxide basis. In one embodiment, the rare earth oxide modified abrasive grains are rods.

20 Claims, 1 Drawing Sheet

5,876,470

ABRASIVE ARTICLES COMPRISING A BLEND OF ABRASIVE PARTICLES

BACKGROUND

The present invention relates to abrasive articles, particularly grinding wheels, having a mixture of two different abrasive grains. The first abrasive grain comprises seeded or nucleated alpha alumina, preferably iron oxide nucleated alpha alumina, and the second abrasive grain comprises rare earth oxide modified alpha alumina.

Fused alumina abrasive grains or particles have been utilized in abrasive applications for close to one hundred years. Fused alumina abrasive grains are made by heating an alumina source above its melting point, quenching, and then crushing to form the alumina abrasive grains. In the early 1980's a new and substantially improved type of alumina abrasive grains, commonly referred to as "sol gel" or "sol gel-derived" abrasive grains, were commercialized. The sol gel abrasive grains were based upon a sintering process rather than a fusion process. In general, sol gel abrasive grains are made by preparing a dispersion or sol comprising water and alumina monohydrate (boehmite), gelling the dispersion, drying the gelled dispersion, crushing the dried dispersion into particles, calcining the particles, and sintering the calcined particles at a temperature below the melting point of alumina. Frequently, the dispersion also includes one or more oxide modifiers, nucleating agents, and/or precursor thereof. Further details regarding sol gel abrasive grain, including methods for making them, are reported in U.S. Pat. Nos. 4,314,827 (Leitheiser et al.), 4,623,364 (Cottringer et al.), 4,744,802 (Schwabel), 4,881,951 (Wood et al.), 5,011,508 (Wald et al.), 5,090,968 (Pellow), 5,201,916 (Berg et al.), 5,213,591 (Celikkaya et al.), and 5,366,523 (Rowenhorst et al.).

Sol gel abrasive grains are typically incorporated into abrasive articles such as coated abrasive articles, nonwoven abrasive articles, and bonded abrasive articles. Bonded abrasive articles include grinding wheels, stones, hones, and cut-off wheels. The bonds used to hold or bond the abrasive grains within the wheel are typically a resin or organic polymers, but may also be inorganic materials such as ceramics or glasses (i.e., vitreous bonds).

Cut-off wheels are typically small thin wheels used for general cutting operations. The wheels are generally several inches in diameter and a few millimeters thick. They may be operated at speeds from about 1000 to 50,000 RPM, and are used for operations such as cutting metal or glass, for example, to nominal lengths. Cut-off wheels are also know as "industrial cut-off saw blades" and, in some settings such as foundries, as "chop saws".

Examples of commercially available cut-off wheels include those available from Minnesota Mining & Manufacturing Company of St. Paul, Minn.(hereinafter referred to as "3M") under the trade designation "General Purpose Cut-Off Wheel". These 3M cut-off wheels utilize fused aluminum oxide abrasive grain. Other commercially available cut-off wheels include wheels available under the designation "Vulcan" from United Abrasives Inc., of Vulcan, Mich., and wheels from Spedecut of Adelanto, Calif. Both of these examples use essentially 100% brown fused aluminum oxide as the abrasive grain. Cut-off wheels such as these are typically used for cutting of softer workpieces such as mild steel (e.g., 1018 MS) and glass.

In an effort to improve the cutting performance and to reduce the cost of the cut-off wheels, manufacturers also produce wheels which have a blend of two or more types of abrasive grain. In some instances a premium, expensive, abrasive grain is partially replaced with a lower quality, less expensive, abrasive grain. For example, U.S. Pat. No. 3,867,795 (Howard) discloses cut-off wheels and methods of making cut-off wheels. These cut-off wheels may contain a blend of fused aluminum oxide and fused alumina-zirconia abrasive grains. Alumina-zirconia is a mid-priced abrasive grain particularly useful in cutting nickel alloys or stainless steel materials. Wheels available under the trade designation "GREEN CORPS" from 3M utilize a blend of equal amounts of fused alumina abrasive grain and an iron oxide nucleated ceramic abrasive grain which contains approximately 4.5% magnesium oxide. Norton Company, of Worcester, Mass., produces a cut-off wheel containing equal amounts of brown fused aluminum oxide and fused alumina-zirconia abrasive grain. Also available from Norton, under the trade designation "Medallion", are cut-off wheels having equal amounts of fused alumina-zirconia abrasive grain and seeded ceramic aluminum oxide grain (the ceramic aluminum oxide grain being commercially available from Norton as loose abrasive grains under the trade designation "SG").

Ceramic aluminum oxide abrasive grains, which are derived from a sol gel process, are particularly useful in cutting carbon steel articles. By combining the premium abrasive grains with lower quality abrasive grains, the overall cost of the wheel, based on the cost of the abrasive grains used, is reduced. Unfortunately, use of lower quality abrasive grains in the wheel may also reduce the cutting performance of the wheel.

The abrasive industry is continuously searching for ways to improve the performance of cut-off wheels by using existing premium abrasive grains, yet maintain good product performance and still keep the cost at acceptable levels. It would be desired to make a wheel which works well on various types of articles yet still has a reasonable price.

SUMMARY OF THE INVENTION

The present invention provides an abrasive article comprising a first abrasive grain comprising seeded or nucleated alpha alumina, and a second abrasive grain comprising alpha alumina and rare earth oxide. The second abrasive grain may be essentially free of a seed or nucleating agent. A suitable binder bonds the first and second abrasive grains together to form an abrasive article.

Preferably, the abrasive article is a bonded abrasive article, typically a grinding wheel. One particular preferred embodiment is a thin grinding wheel generally known as a cut-off wheel. A cut-off wheel is a thin grinding wheel, generally 1 mm (0.035 inch) to 8 mm (0.315 inch) thick, having a 2.5 cm (1 inch) to 50 cm (20 inch) diameter. Cut-off wheels are used for general purpose cutting operations.

DETAILED DESCRIPTION OF PREFERRED EMBODIMENTS

Figure 1:
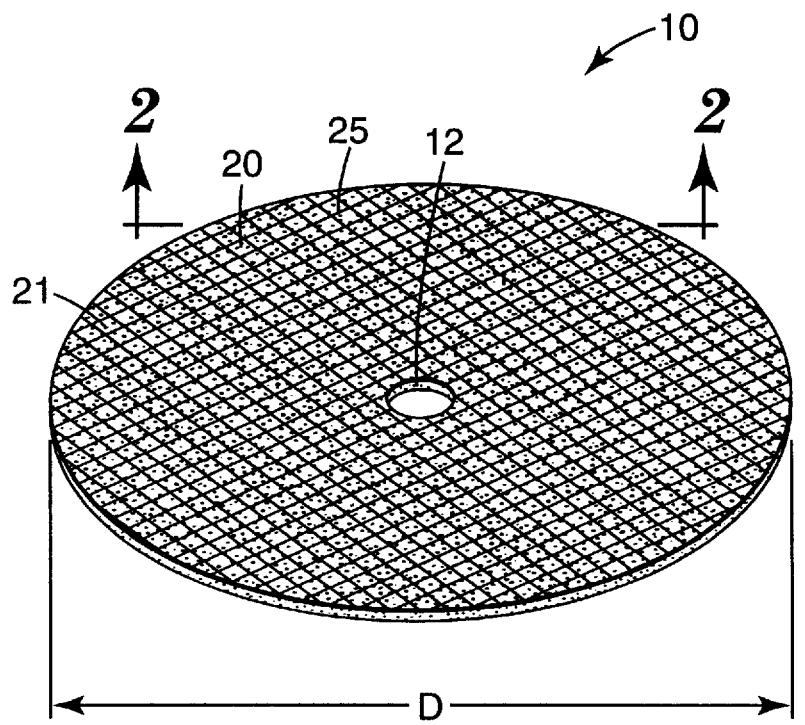
FIG. 1 is a perspective view of a cut-off wheel of the present invention.

FIG. 1 is a perspective view of a cut-off wheel 10 made according to one of the embodiments of the present invention. Cut-off wheel 10 has thickness T (shown in FIG. 2) which is substantially less than diameter D of cut-off wheel 10. Cut-off wheels are generally 1 mm (0.035 inch) to 16 mm (0.63 inch) thick, preferably 1 mm to 8 mm (0.315 inch), and have a diameter between about 2.5 cm (1 inch) and 100 cm (40 inches), typically between about 7 cm (3 inches) and 13 (5 inches) cm, although wheels as large as 100 cm (40 inches) in diameter are known. Center hole 12 is used for attaching cut-off wheel 10 to, for example, a power driven tool. The center hole is generally about 0.5 cm to 2.5 cm in diameter.

Cut-off wheels of the present invention have first abrasive grain 20 (either seeded or nucleated alumina abrasive grain) and second abrasive grain 21 (rare earth oxide modified alumina abrasive grain) held together by binder 25. The binder, or bonding medium, may be an organic or inorganic binder. Typical inorganic bonds include vitreous (also known as "glass"), ceramic binders, and metal binders.

The cut-off wheels of the present invention are generally made via a molding process. During molding, the binder or bonding medium, either liquid organic, powdered inorganic, or powdered organic, is mixed with the abrasive grains. In some instances, a liquid medium (either resin or a solvent) is first applied to the grain to wet the abrasive grain's outer surface, and then the wetted grains are mixed with a powdered medium. The cut-off wheel of the invention may be made by compression molding, injection molding, transfer molding, or the like. The molding can be either by hot or cold pressing or any suitable manner known to those skilled in the art.

Phenolic resin is the most commonly used organic binder and is used in both the powder form and liquid state. Although phenolic resins are widely used, it is within the scope of this invention to use other organic binders. These binders include epoxy, urea formaldehyde, rubber, shellac, acrylate functional binders, and the like. The phenolic binder may also be modified with another binder materials to improve or alter the properties of the phenolic. For example, the phenolic may be modified with a rubber to improve the toughness of the overall binder.

Vitrified or glass binders may be made from a mixture of different metal oxides. Examples of these metal oxide vitreous binders include silica, alumina, calcia, iron oxide, titania, magnesia, sodium oxide, potassium oxide, lithium oxide, manganese oxide, boron oxide, phosphorous oxide, and the like. Specific examples of vitreous binders based upon weight include, for example, 47.61% $SiO_2$, 16.65% $Al_2O_3$, 0.38% $Fe_2O_3$, 0.35% $TiO_2$, 1.58% CaO, 0,10% MgO, 9,63% $Na_2O$, 2.86% $K_2O$, 1.77% $Li_2O$, 19.03% $B_2O_3$, 0.02% $MnO_2$, and 0.22% $P_2O_5$; and 63% silica, 12% alumina, 1.2% calcium oxide, 6.3% sodium oxide, 7.5% potassium oxide, and 10% boron oxide. Still other examples of vitreous binder based upon a molar ratio include 3.77% $SiO_2$, 0.58% $Al_2O_3$, 0.01% $Fe_2O_3$, 0.03% $TiO_2$, 0.21% CaO, 0.25% MgO, 0.47% $Na_2O$, and 0.07% $K_2O$. During manufacture of a vitreous bonded abrasive article, the vitreous binder, in a powder form, may be mixed with a temporary binder, typically an organic binder. The vitrified binders may also be formed from a frit, for example anywhere from about one to 100% frit, but generally 20 to 100% frit. Some examples of common materials used in frit binders include feldspar, borax, quartz, soda ash, read lead, zinc oxide, whiting, antimony trioxide, titanium dioxide, sodium silicofluoride, flint cryolite, boric acid, and combinations thereof. These materials are usually mixed together as powders, fired to fuse the mixture and then the fused mixture is cooled. The cooled mixture is crushed and screened to a very fine powder to then be used as a frit binder. The temperature at which these frit bonds are matured is dependent upon its chemistry, but may range from anywhere from about 600° C. to about 1800° C.

Examples of metal binders include tin, copper, aluminum, nickel, and combinations thereof.

Figure 2:
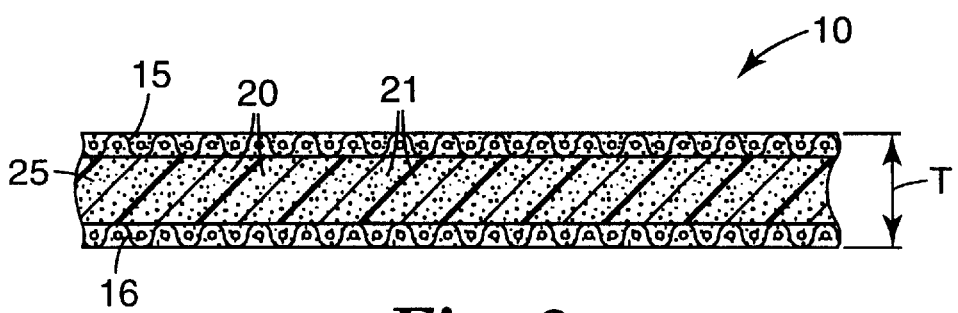
FIG. 2 is a cross-section of the cut-off wheel of FIG. 1 taken along line 2—2.

In most instances, a scrim reinforcing material is incorporated into the cut-off wheel to improve the rotational burst strength, that is, the ability of the wheel to withstand the centrifugal forces produced by the wheel's rotation during use. The wear properties or heat resistance of the wheel may also be improved by using a scrim reinforcing material. FIG. 2 is a cross-section of the cut-off wheel of FIG. 1 taken along line 2—2. First abrasive grain 20, second abrasive grain 21, and binder 25 are shown. Cut-off wheel 10 has first scrim 15 and second scrim 16 which are located at the outer faces of cut-off wheel 10. Generally, one piece of scrim reinforcing material is located on each outer face of the wheel. Alternately, it is feasible to include one or more reinforcing scrim pieces inside the wheel for additional strength. The scrim may be made from any suitable material. For example, the scrim can be a woven or a knitted cloth. The fibers in the scrim are preferably made from glass fibers (e.g., fiberglass). In some instances, the scrim may contain a coupling agent treatment (e.g., a silane coupling agent). The scrim may also contain organic fibers such as polyamide, polyester, polyaramid, or the like. In some instances, it may be preferred to include reinforcing staple fibers within the bonding medium, so that the fibers are homogeneously dispersed throughout the cut-off wheel.

Two types of abrasive grain are utilized in the cut-off wheels of the present invention. Both are alpha-alumina based abrasive grain; one grain being either seeded or nucleated by an appropriate nucleating agent (e.g., alpha alumina seed particles, iron oxide or its precursors, chromia, manganese oxide, titanates, and the like), and the other grain having at least 0.01%, preferably 0.1–10% rare earth oxide modifiers, calculated on a theoretical oxide basis based on the total oxide content of the abrasive grain. The first and second abrasive grains can be produced by a sintering process, preferably by a sol gel process. The combination of these two abrasive grains, i.e., the seeded or nucleated abrasive grain and the rare earth oxide modified abrasive grain, provides improved performance over other abrasive grains or grain blends when used in abrasive articles, in particular in cut-off wheels. It is surprising that a blend of these two different sol gel grains results in a synergistic effect.

In general, sol gel abrasive grains are made by preparing a dispersion or sol comprising a liquid (typically water) having a volatile component, a peptizing agent, and alumina monohydrate (boehmite), gelling the dispersion, drying the gelled dispersion, crushing the dried dispersion into precursor particles, calcining the precursor particles, and sintering the calcined particles at a temperature below the melting point of alumina. Frequently, the dispersion also includes one or more oxide modifiers, seed or nucleating agents, and/or precursors thereof. The metal oxides (sometimes referred to as metal oxide modifiers) may be incorporated to change the physical properties and/or the crystal microstructure of the resulting abrasive grains.

Examples of metal oxides that may be incorporated into the abrasive grain according to the present invention, but are not necessarily desirable, include magnesium oxide (MgO), zinc oxide (ZnO), cobalt oxide (CoO), nickel oxide (NiO), zirconium oxide ($ZrO_2$), titanium oxide ($TiO_2$), iron oxide ($Fe_2O_3$), yttrium oxide ($Y_2O_3$), manganese oxide (MnO), praseodymium oxide ($Pr_2O_3$), samarium oxide ($Sm_2O_3$), ytterbium oxide ($Yb_2O_3$), neodymium oxide ($Nd_2O_3$), lanthanum oxide ($La_2O_3$), gadolinium oxide ($Gd_2O_3$), cerium oxide ($Ce_2O_3$), dysprosium oxide ($Dy_2O_3$), erbium oxide ($Er_2O_3$), europium oxide ($Eu_2O_3$), hafnium oxide ($HfO_2$), chromium oxide ($Cr_2O_3$), strontium oxide (SrO), calcium oxide (CaO), sodium oxice ($Na_2O$) and combinations thereof. Certain of these metal oxides may react with the alumina to form a reaction product with the alumina, whereas others will remain as the metal oxide. For example, the oxides of cobalt, nickel, zinc, and magnesium typically react with alumina to form a spinel, whereas zirconia and hafnia do not react with the alumina. Alternatively, the reaction product of dysprosium oxide and gadolinium oxide with alumina is generally garnet. The reaction products of praseodymium oxide, ytterbium oxide, erbium oxide, and samarium oxide with alumina generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such an aluminate has a hexagonal crystal structure.

The dispersion may contain a seed or nucleating agent or material to enhance the transformation of the alpha alumina precursor (alpha alumina monohydrate) to alpha alumina. Suitable materials include fine particles of alpha alumina, or fine particles or precursors of alpha ferric oxide, chromia, titanates, and any other material which will nucleate the alpha alumina transformation. The addition of a seed or nucleating agent results in having smaller crystallites or cells in the resulting alumina abrasive grain, producing a more durable abrasive grain.

After the sol or dispersion is prepared, it is then dried, such as in a forced air oven, to form a porous solid. After drying, the dried dispersion is typically crushed to form irregular precursor particles which are then calcined. Optionally, the gel, dried gel, or precursor particles can be shaped before the dispersion is calcined. Calcining, sometime referred to as prefiring, removes essentially all bound volatile materials and is typically done at temperatures between about 400° C. and 800° C. Then sintering, also referred to as firing, is done at temperatures below the melting point of alumina. Typical sintering temperatures are between about 1100° C. and 1650° C., preferably between about 1250° C. and 1400° C.

Additional details regarding sol gel abrasive grains and general methods of making these types of grains are disclosed, for example, in U.S. Pat. Nos. 4,314,827 (Leitheiser et al.), 4,744,802 (Schwabel), and 4,881,951 (Wood et al.), the disclosures of which are incorporated herein by reference.

Alpha Alumina Seeded Abrasive Grain

Typically, alpha alumina seeded abrasive grain comprises alpha alumina and any optional additives. Details regarding alpha alumina seeded abrasive grains and method of making the grains are disclosed, for example, in U.S. Pat. Nos. 4,623,364 (Cottringer et al.) and 4,744,802 (Schwabel), the disclosures of which are incorporated herein by reference.

The amount of particulate alpha alumina seed may vary considerably. Suitable seeding has been obtained with amounts varying from about 0.01% to about 50% by weight based on the total weight of the alumina abrasive grain, although amounts outside of this range are also thought to be useful, however less than about 2%, typically less than 1%, is argued to be the optimum amount. The particle size of the alpha alumina particles may also vary considerably; particle sizes from about 80 to 700 nanometers have been found to be useful.

The source of the alpha alumina seed particles is relatively unimportant. Commercially available particulate includes that from Sumitomo Chemical Co. Ltd. under the trade designation "AKP-50". Alternately, the alpha alumina seed particles may be generated in situ, for example, by ball milling the dispersion in an alpha alumina ceramic container or with alpha alumina milling balls.

Typically, an alpha alumina seeded alumina abrasive grain has a high density of sub-micron equiaxial alumina crystals, a non-cellular microstructure, and has a hardness of at least about 16 GPa.

Iron Oxide Nucleated Abrasive Grain

Typically, iron oxide nucleated abrasive grain comprises, on a theoretical oxide basis based on the total oxide content of the abrasive grain, in the range from about 0.1 to about 5 percent by weight iron oxide. Details regarding iron oxide nucleated abrasive grains and methods of making the grains are disclosed, for example, in U.S. Pat. Nos. 4,744,802 (Schwabel), and 4,964,883 (Morris et al.), the disclosures of which are incorporated herein by reference.

The type of iron oxide source used to make the abrasive grains described herein may vary. Sources of iron oxide, which in some cases may act as or provide a material that acts as a nucleating agent, include hematite ($\alpha$-$Fe_2O_3$), as well as precursors thereof (goethite ($\alpha$-FeOOH), lepidocrocite ($\gamma$-FeOOH), magnetite ($Fe_3O_4$), and maghemite ($\gamma$-$Fe_2O_3$)). Suitable precursors of iron oxide include iron-containing material that, when heated, will convert to $\alpha$-$Fe_2O_3$. Preferably, the iron oxide source is a crystalline particulate material. Such particulate material may be spherical, acicular, or plate-like, depending upon the crystallinity of the particles and/or the method of preparation. Whatever the shape of the particulate material, it preferably has a surface area of at least about 60 $m^2/g$ (more preferably, at least about 80 $m^2/g$, and most preferably, at least about 100 $m^2/g$), and an average particle size of less than about 1 micrometer (more preferably, less than about 0.5 micrometer). In this context, "particle size" is defined by the longest dimension of an isolated or single particle or abrasive grain. In preferred embodiments, the crystalline particles are acicular with an aspect ratio of at least about 2:1. One particularly preferred material has acicular particles with a length of about 0.04–0.1 micrometer and a width of about 0.01–0.02 micrometer. Such particles may be obtained from a variety of suppliers of magnetic media pigment such as Magnox Pulaski, Inc., Pulaski, Va. (available, for example, as an aqueous-based paste of iron oxyhydroxide ($\alpha$-FeOOH), acicular particles with an average particle size of about 0.08 micrometer and a surface area of about 104.5 $m^2/g$ under the designation "GOETHITE A").

The surface area of the particulate source of iron oxide is typically measured by nitrogen absorption using a Quantasorb System OS-10 from Quantachrome Corp. of Boynton Beach, Fla. The particle size may be determined by measuring the longest dimension of the particle using a variety of techniques. For example, the particle size may be measured using a Transmission Electron Microscope, whereby a micrograph is taken of a collection of the particles at appropriate magnification and then the size of the particles is measured. Another particle size measurement technique is Quasi Elastic Light Scattering in which a light beam is scattered by the particles. The particle size is determined by numerical analysis of the fluctuations of the intensity of light scattered by the particles.

Typically, an iron oxide nucleated alumina abrasive grain has a microstructure similar to an alpha alumina seed abrasive grain, i.e., high density of sub-micron equiaxial alumina crystals, a non-cellular microstructure, and has a hardness of at least about 16 GPa. Generally, the iron is present as a solid solution in the alumina or as an iron-alumina spinel.

Additional details regarding the addition of iron sources to the dispersion or precursor are reported, for example, in U.S. Pat. Nos. 5,611,829 (Monroe et al.) and 5,645,619 (Erickson et al.), the disclosures of which are incorporated herein by reference.

Rare Earth Oxide Modified Abrasive Grain

The second abrasive grain comprises a rare earth oxide or yttria modified alumina abrasive grain. The second abrasive grain may comprise: 1) only one type of rare earth oxide modifier, 2) only yttria and no rare earth oxide modifier, 3) one rare earth oxide modifier and yttria, 4) two or more rare earth oxide modifiers, or 5) two or more rare earth oxide modifiers and yttria. In general, the preferred second abrasive grains comprise lanthanum and neodymium rare earth oxides and yttria.

The rare earth oxide or yttria modified alumina abrasive grains of the present invention comprise, on a theoretical oxide basis, at least 0.01 percent by weight (preferably in the range from at least 0.1 percent to about 10 percent by weight; more preferably, in the range from about 0.5 to about 10 percent ), based on the total theoretical metal oxide content of the abrasive grain, of at least one rare earth metal oxide or yttria. Rare earth metal oxides are classified as those oxides in the Lanthanide series. Rare earth metal oxides include oxides of cerium, praseodymium, neodymium, samarium, europium, gadolinium, dysprosium, erbium, ytterbium and lanthanum.

The rare earth metal oxide may be provided in the abrasive grain by any rare earth metal oxide precursor (e.g., a salt such as a metal nitrate, a metal acetate salt, a metal citrate salt, or a metal formate salt) that converts to a metal oxide upon decomposition by heating, and/or particles of metal oxide which may have been added to the alumina-based dispersion as a particulate (preferably having a particle size (i.e., the longest dimension) of less than about 5 micrometers; more preferably, less than about 1 micrometer) and/or added as a metal oxide sol.

The rare earth oxide and/or yttria are incorporated into the abrasive grains either by introducing precursor materials into the sol, or by impregnating either dried precursor or calcined precursor particles with the rare earth oxides or precursors thereof. In general, methods of including modifiers in the sol are reported, for example, in U.S. Pat. Nos. 4,881,951 (Wood et al.) and 5,498,269 (Larmie) and U.S. application Ser. No. 08/715,672 (Wood) filed Sept. 18, 1996; methods of impregnating precursor particles are described, for example, in U.S. Pat. No. 5,164,348 (Wood), and U.S. application Ser. No. 08/781,558 (Wood) filed Jan. 9, 1997, the disclosures of all are incorporated herein by reference. U.S. Pat. No. 4,770,671 (Monroe et al.) reports additional information about rare earth oxide and yttria modified abrasive grain, the disclosure of which is incorporated herein by reference.

The rare earth oxides and yttrium oxide tend to react with alumina to form reaction products, generally garnet. For example, the reaction product of dysprosium oxide and gadolinium oxide with aluminum oxide is generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure. Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such an aluminate has a hexagonal crystal structure.

The rare earth oxide and yttria modified abrasive grains may optionally contain a seed or nucleating agent. These seeds and nucleating agents are described above. It is preferred sometimes that the second abrasive grain (i.e., the rare earth oxide or yttria modified alumina abrasive grains) are essentially free of seed or nucleating agent.

The first and second abrasive grains may be mixed in any ratio, for example in amounts from 90/10 to 10/90 by weight, preferably 30/70 to 70/30. It is most preferable that the amounts, by weight, of the two abrasive grains are essentially equal, i.e., approximately 50/50, however, ratios of 60/40 with either grain being more, may also be preferable. There may, however, be other ratios which are preferred, depending on the article which will be cut. In some situations, it may be desired to include a third abrasive grain. This third abrasive grain may be any amount, but is desired that at least 50% of the abrasive grains in the article of the present invention are of the mixture of seeded or nucleated grains and rare earth oxide modified abrasive grains.

The particle size of the abrasive grains is generally between about 0.1 micrometers and 1500 micrometers, typically between 10 and 1000 micrometers, and preferably between 180 and 800 micrometers, although larger and small particles sizes may be useful. Generally, the average particle size of the abrasive grains used in cut-off wheels is between about 500 and 700 micrometers, which corresponds approximately to ANSI Grades 36 and 24, respectively.

It is within the scope of the invention that the average particle size of one type of abrasive grain, e.g., the seeded or nucleated abrasive grain, is larger than the average particle size of the other abrasive grain, i.e., the rare earth oxide modified abrasive grain. Alternately, the rare earth oxide modified abrasive grains could have a larger average particle size. In general, it is preferred that the abrasive grain doing the cutting work is the larger of the abrasive grain blend and of any filler particles. In this particular invention, the two abrasive grains act synergistically to provide the high cutting performance. By "synergistic", it is meant that the combination of the two grains works better than when compared to each individual abrasive grain alone. It is most preferable that both the first and second abrasive grains are approximately, if not essentially, the same size range.

Either or both abrasive grains used in the present invention may be irregular or be shaped. Irregularly shaped grains are made, for example, by crushing the precursor particles before the precursor is sintered to form the final abrasive grain particle. Shaped abrasive grains include rods (having any cross-sectional area), pyramids, and thin faced particles having polygonal faces. Shaped abrasive grains and methods of making them are reported, for example, in U.S. Pat. Nos. 5,090,968 (Pellow) and 5,201,916 (Berg et al.). Other methods of making shaped abrasive grains are taught in U.S. application Ser. No. 08/715,672 (Wood) filed Sep. 18, 1996.

The abrasive grains in the cut-off wheel of the present invention may alternatively be in the form of an agglomerate, i.e., abrasive grains adhered together to form an abrasive agglomerate. Agglomerates are further described in U.S. Pat. Nos. 4,311,489 (Kressner), 4,652,275 (Bloecher et al.), 4,799,939 (Bloecher et al.), 5,039,311 (Bloecher), and 5,500,273 (Holmes et al.), all incorporated herein by reference.

It is also possible to have a surface coating on either or both of the abrasive grains. Surface coatings may be used to increase the adhesion to the binder, to alter the abrading characteristics of the abrasive grain, or for other purposes. Examples of surface coatings are reported in U.S. Pat Nos. 4,997,461 (Markhoff-Matheny et al.), 5,011,508 (Wald et al.), 5,131,926 (Rostoker), 5,213,591 (Celikkaya et al.), and 5,474,583 (Celikkaya). A particularly preferred coating is reported in 5,213,591 (Celikkaya et al.).

The abrasive grains may be located throughout the thickness of the wheel, or be concentrated toward the middle, that is, away from the outer faces of the wheel. Alternately, the abrasive grains may be located only in the outer edge, i.e., the periphery, of the cut-off wheel. In another variation, a first abrasive grain may be in one side of the wheel with the second abrasive grain on the other side. In another embodiment, one abrasive grain (e.g., the first, seeded or nucleated abrasive grains) may be predominantly on one face of the wheel, and the other grain (i.e., the second, rare earth oxide or yttria modified, abrasive grains) is on the other face of the wheel. Or, one abrasive grain may be in the outer edge, i.e., the periphery, of the cut-off wheel, and the other grain may be in the center portion of the wheel closest to center hole 12. However, it is preferred that the two abrasive grains (i.e., the rare earth oxide modified abrasive grain and the seeded or nucleated abrasive grain) are homogenous among each other, because the manufacture of the wheels is easier, and the synergistic cutting effect is optimized when the two types of grain are closely positioned to each other.

It is foreseen that the cut-off wheels of the present invention may also comprise other abrasive grain, for example fused aluminum oxide (including fused alumina-zirconia), brown aluminum oxide, blue aluminum oxide, silicon carbide (including green silicon carbide), garnet, diamond, cubic boron nitride, boron carbide, chromia, ceria, and combinations thereof. However, at least about 50% by weight, preferably about 80% by weight, and most preferably 100% of the abrasive grain in the cut-off wheel should be the mixture of seeded or nucleated grain and rare earth oxide modified abrasive grain.

Additional Additives

The cut-off wheel of the present invention generally contains filler particles. Filler particles are added to the cut-off wheel to occupy space and/or provide porosity. Porosity enables the cut-off wheel to "break down", i.e., to shed used or worn abrasive grain to expose new or fresh abrasive grain. This break down characteristic is strongly dependent upon the cut-off wheel formulation including the abrasive grain, binder or bonding medium, additives and the like. The amount of porosity strongly influences the cut-off wheel break down. Cut-off wheels have any range of porosity, for example, from about 1% to 50%, typically 1% to 40% by volume. Methods of incorporating porosity in the cut-off wheel include the use of porous bodies, diluents, fillers, or other soft particles. Examples of fillers useful in cut-off wheels include, but are not limited to, bubbles and beads (e.g., glass, ceramic (alumina), clay, polymeric, metal), cork, gypsum, marble, limestone, flint, silica, aluminum silicate, and the like. Bubbles and cork are frequently used porosity sources. Another method to incorporate porosity is to include an expanding agent in the article. Fugitive materials that decompose during the heating of either the organic or inorganic bonding medium will generally leave porosity. These fugitives materials are typically utilized more in vitrified (i.e., inorganic) materials than in resin bonded articles. Examples of such fugitive materials include walnut shells, sugar, diphthalic hydrocarbons, thermoplastic particles, and the like.

A grinding aid particle, such as for example, cryolite, sodium chloride, $FeS_2$ (iron disulfide), or $KBF_4$, can also be added to the wheel. Grinding aids are added to improve the cutting characteristics of the cut-off wheel, generally by reducing the temperature of the cutting interface. The grinding aid may be in the form of single particles or an agglomerate of grinding aid particles. Examples of precisely shaped grinding aid particles are taught in PCT application Ser. No. US96/14570 (Culler et al.) filed Sep. 11, 1996.

Methods of Using Cut-Off Wheels

The cut-off wheel of the invention can be used on any right angle grinding tool, such as those available from Ingersoll-Rand, Sioux, Milwaukee, and Dotco. The tool can be electric or pneumatic driven, generally at speeds from about 1000 to 50,000 RPM. During use, the cut-off wheel can be used dry or wet. During wet grinding, the wheel is used in conjunction with water, oil based lubricants, or water based lubricants.

The cut-off wheel of the present invention is particularly useful on various workpiece materials, such as for example, carbon steel sheet or bar stock. Conventional cut-off wheels are designed to provide good performance on either, or both, the harder and more exotic metals (i.e., stainless steel, titanium, etc.), or on softer more ferrous metals (i.e., mild steel, low alloy steels, cast irons, etc.).

The efficiency of a cut-off wheel is typically measured by the amount of cutting ability. This measurement is typically referred to as "G-ratio", which is calculated as the volume of workpiece material removed divided by the volume of abrasive article lost. A larger G-ratio, higher volumes of workpiece removed over smaller volumes of abrasive article lost, is preferred over a smaller G-ratio.

Although the present invention is aimed at bonded wheels, in particular cut-off wheels, this mixture of the seeded or nucleated abrasive grains and rare earth oxide modified abrasive grains may be useful in other abrasive articles, such as for example, coated abrasives, lapping abrasives, structured abrasives and nonwovens.

A coated abrasive article typically comprises a flexible backing onto which is adhered a "make" coat (i.e., first adhesive layer). Into the make coat are embedded abrasive particles, and then the particles are overlaid by a "size" coat (i.e., second adhesive layer). An optional second size coat, known as a "supersize" coating may be applied over the size coat. Typically, the supersize coating includes a grinding aid material or an anti-loading additive. Grinding aids are further discussed below. The backing can be any suitable material, including cloth, polymeric film, vulcanized fibre, nonwoven webs, paper, combinations thereof, and treated versions thereof. The binder can be any suitable binder, including an inorganic or organic binder. The mix of abrasive grains can be present in one layer or in two layers of the coated abrasive product. Preferred methods of making coated abrasive products are described, for example, in U.S. Pat. Nos. 4,734,104 (Broberg), 4,751,138 (Tumey et al.), 5,496,386 (Broberg et al.) and 5,573,619 (Benedict et al.), the disclosures of which are incorporated herein by reference.

The coated abrasive product can have an attachment means on its back surface to secure the coated abrasive product to a support pad or backup pad. Such attachment means can be, for example, a pressure sensitive adhesive or a loop fabric for a hook and loop attachment. The back side of the coated abrasive product may also contain a slip resistant or frictional coating. Examples of such coatings include an inorganic particulate material (e.g., calcium carbonate or quartz) dispersed in an adhesive. The coated abrasives can be converted into conventional shapes such as belts, sheets and disks.

Another example of an abrasive article is a lapping or slurry coated abrasive article. A lapping abrasive article is prepared by combining the abrasive grains, binder precursor (generally a suitable adhesive material) and any optional additives to form a homogenous slurry. This slurry, while in a liquid state, is then applied to a backing to provide a uniform layer of abrasive grains, and then cured. Examples of typical coating techniques used for lapping abrasive articles include knife coaters, die coaters, vacuum dies, curtain coaters, and gravure rolls. Often when using a gravure roll, a texture is imparted into the abrasive coating which may remain in the coating once the slurry has been cured. This texture or structured coating is irregular and non-precise.

A structured abrasive article comprises a plurality of abrasive composites comprising abrasive grains and binder, the binder bonding the composites to a backing. The composites can be precisely shaped. It is generally preferred that each abrasive composite has a precise shape associated with it. The precise shape is determined by distinct and discernible boundaries. These boundaries form the outline or contour of the precise shape, and to some degree separate one abrasive composite from another. The composites are usually formed by filling cavities in a tool with an abrasive slurry comprising abrasive particles and binder precursor, and then curing the binder precursor while in the tool, such that the cured composite has the inverse shaped of the cavity. To form a textured abrasive article comprising irregular composites, the slurry may be removed from the tooling prior to curing the binder precursor. This will cause the slurry to slump prior to curing and create an imprecisely shaped composite. Additional details on structured abrasive articles and methods of making them are disclosed, for example, in U.S. Pat. Nos. 5,152,917 (Pieper et al.), 5,435,816 (Spurgeon et al.), 5,489,235 (Gagliardi et al.), and PCT application Publication No. WO 95/07797, the disclosures of which are incorporated herein by reference.

Yet another type of abrasive article in which the blend of abrasive grains of the present invention may be useful is a nonwoven abrasive article. Nonwoven abrasive articles typically include an open porous lofty polymer filament structure having abrasive grains distributed throughout the structure and bonded therein by an organic binder. Examples of filaments include polyester fibers, polyamide fibers, and polyaramid fibers. For further details regarding nonwoven abrasive products, see, for example, U.S. Pat. No. 2,958,593 (Hoover et al.), the disclosure of which is incorporated herein by reference.

It is also within the scope of this invention to use the abrasive grains in a loose abrasive slurry. These abrasive slurries typically comprise a mixture of the abrasive grains and a liquid. This liquid is generally water and sometimes organic solvent. Sometimes, the liquid is a mixture of water and other additives such as rust inhibitors, anti-foams, anti-bacterial compounds, and the like. The loose abrasive slurry can be used wet or dry, such as in sandblasting type operations. Alternatively, the loose abrasive slurry can be used in combination with a lap or a polishing pad for lapping applications.

Suitable organic binders for the above discussed abrasive articles according to the present invention include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, and combinations thereof. The binder and/or abrasive product can also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive grain and/or the filler.

The binder can also contain filler materials or grinding aids, typically in the form of a particulate material. Typically, the particulate materials are inorganic materials. Examples of particulate materials that act as fillers include metal carbonates, silica, silicates, metal sulfates, metal oxides, and the like. Examples of particulate materials that act as grinding aids include: halide salts such as sodium chloride, potassium chloride, sodium cryolite, and potassium tetrafluoroborate; metals such as tin, lead, bismuth, cobalt, antimony, iron, and titanium; organic halides such as polyvinyl chloride and tetrachloronaphthalene; sulfur and sulfur compounds; graphite; and the like. A grinding aid is a material that has a significant effect on the chemical and physical processes of abrading, which results in improved performance. In a coated abrasive product, a grinding aid is typically used in the supersize coat applied over the surface of the abrasive grain, although it can also be added to the size coat. Typically, if desired, a grinding aid is used in an amount of about 50–300 $g/m^2$ (preferably, about 80–160 $g/m^2$) of an abrasive product.

Objects and advantages of this invention are further illustrated by the following examples, but the particular materials and amounts recited in these examples, as well as other conditions and details, should not be construed to unduly limit this invention. All parts and percentages are by weight unless otherwise indicated.

EXAMPLES

General Method of Preparing a Cut-Off Wheel

The cut-off wheels were made according to the general method described below.

69.31 parts abrasive grain were mixed with 4.95 parts liquid phenolic resin in a paddle mixer. Meanwhile, 13.86 parts dry powdered phenolic resin and 11.88 parts cryolite were mixed together. The wet mixture of resin & abrasive grain was slowly added to the dry powder mixture and tumbled. The resulting homogenous particulate mixture, consisting of 69.31 wt-% abrasive grain, 18.81 wt-% resin, and 11.88 wt-% cryolite grinding aid, was screened to provide uniform particles. These were loaded into the hopper of a hydraulic press. A die, corresponding to the dimensions of the resulting cut-off wheel (10 cm diameter, 0.16 cm thick, with a 0.95 cm diameter center hole (4"×0.0625"×0.375")), was placed in the press. A fiberglass scrim was inserted in the bottom of the die, enough resin mixture to fill the die was added, and a second scrim was placed over the mixture. The combination was then pressed at about 1410–2110 $kg/cm^2$ (10–15 tsi) to produce a green wheel. The resulting green wheel was placed between steel plates and Teflon coated mats. Fifteen layers were stacked and compressed at about 7 $kg/cm^2$ (100 psi). The compressed stack, under pressure, was placed in an oven which was heated to 185° C. over about 16 hours, and then maintained at temperature for about 16 hours, and cooled. The total heating and cooling cycle was 40 hours. The wheels were removed from the oven and then the center arbor holes were reamed to the standard size.

Examples 1 and 2 were prepared according to the General Method of Preparing a Cut-Off Wheel. Iron oxide nucleated sol gel abrasive grain (94.3% $Al_2O_3$, 4.5% MgO, 1.2% $Fe_2O_3$), were mixed with an equal amount of rare earth oxide modified sol gel abrasive grain, made according to the methods reproted in U.S. Pat. No. 5,213,591 (Celikkaya et al.).

For Example 1, both the iron oxide nucleated abrasive grain and the rare earth oxide modified abrasive grain were ANSI Grade 36.

Comparative Example A was prepared as in Example 1, except Comparative Example A used only ANSI Grade 36 rare earth oxide modified grain; no iron oxide nucleated grain was used.

Example 1 and Comparative Examples A were tested on 1018 mild steel (20 gauge) and 304 stainless steel workpieces. The cut-off wheels were mounted on an electric drive motor which ran at 11,950 RPM. Four 61 cm (24 inch) long straight cuts, 1.27 cm (0.50 inch) deep, were made on the workpiece at a constant traverse rate of 0.635 cm/sec (0.250 inch/sec). The relative cutting performances were compared to their measured wear characteristics. The wear of the wheel was calculated from the amount of weight lost by the wheel. The calculated cutting efficiencies for exemplified wheels are listed as "G-ratio" in Table 1.

For Example 2, equal amounts of the iron oxide nucleated abrasive grain and the rare earth oxide modified abrasive grain were used. Each of the grains was a mix of equal amounts of ANSI Grades 36, 50 and 60.

Comparative Example B was prepared as in Example 2, except Comparative Example B used only the rare earth modified abrasive grain in the same three grade ratios and no iron oxide nucleated abrasive grain.

Comparative Example C. was prepared as in Example 2, except Comparative C. used iron oxide nucleated abrasive grain of only ANSI Grade 36 and heat treated fused aluminum oxide abrasive grain in a 60/40 ratio of ANSI Grades 50 and 60.

Comparative Example D was prepared as in Comparative Example C, except Comparative Example D used only the fused aluminum oxide of ANSI Grade 36 and no iron oxide nucleated abrasive grain.

Example 2 and Comparative Examples B–D were tested on 1018 mild steel and 304 stainless steel workpieces as previously described. The results are listed in Table 1.

Example 3 was prepared as in Example 1, except both the iron oxide nucleated abrasive grain and the rare earth oxide modified abrasive grain were ANSI Grade 30 rather than Grade 36.

Comparative Example E was prepared as in Example 3, except Comparative Example E used only the rare earth modified abrasive grain and no iron oxide nucleated abrasive grain.

Comparative Example F was prepared as in Example 3, except Comparative Example F used only the iron oxide nucleated abrasive grain and no rare earth modified abrasive grain.

Comparative Example G was prepared as in Comparative Example F, except the abrasive grain were ANSI Grade 36 rather than Grade 30.

Comparative Example H was prepared as in Example 3, except Comparative Example H used an equal amount of the iron oxide nucleated abrasive grain in ANSI Grade 30 and the fused alumina abrasive grain (described in Comparative Example C) in a 60/40 ratio of ANSI Grades 40 and 60.

Comparative Example I was prepared as in Comparative Example H, except the iron oxide nucleated abrasive grain were ANSI Grade 36, and the fused alumina abrasive grain were a 60/40 mix of ANSI Grades 50 and 60.

Example 3 and Comparative Examples E–I were tested on 1018 mild steel and 304 stainless steel workpieces as previously described. The results are listed in Table 1.

Example 4 was prepared as in Example 1, except both the iron oxide nucleated abrasive grain and the rare earth oxide modified abrasive grain were ANSI Grade 24 rather than 36, and the thickness of the cut-off wheel was 0.317 cm (0.125 inch).

Example 5 was prepared as in Example 4, except both abrasive grains were ANSI Grade 30 rather than 24.

Comparative Example J was prepared as in Example 4, except that no rare earth oxide modified abrasive grain were used.

Comparative Example K was prepared as in Example 5, except that no rare earth oxide modified abrasive grain were used.

Comparative Example L was prepared as in Example 4, except the fused alumina abrasive grain were used rather than the rare earth oxide modified abrasive grain.

Comparative Example M was prepared as in Comparative Example L, except the fused alumina abrasive grain were a 60/40 mix of ANSI Grades 36 and 50.

Examples 4–5 and Comparative Examples J–M were tested on 1018 mild steel as previously described. The results are listed in Table 1.

Example 6 was prepared according to the method outlined in Example 1.

Comparative Example N was prepared according to the method outlined in Example 6, except no iron oxide nucleated abrasive grain were used.

Comparative Example O was prepared according to the method outlined in Example 6, except no rare earth modified abrasive grain were used.

Comparative Example P was prepared according to the method outlined in Example 6, except the fused alumina abrasive grain were used rather than the rare earth oxide modified abrasive grain. The fused alumina abrasive grain were a 60/40 ratio of ANSI Grades 50 and 60.

Example 6 and Comparative Examples N–P were tested on 1018 mild steel and 304 stainless steel workpieces as described above. The results are listed in Table 1 below.

TABLE 1

|  | 1018 MS G-Ratio | 1018 MS % Wear | 304 SS G-Ratio | 304 SS % Wear |
| --- | --- | --- | --- | --- |
| Example 1 | 58 | 1.2 | 13 | 6.0 |
| Comp. Ex A | 44 | 1.9 | 19 | 4.2 |
| Example 2 | 48 | 1.5 | 23 | 6.0 |
| Comp. Ex B | 40 | 1.6 | 18 | 4.6 |
| Comp. Ex C | 45 | 1.7 | 10 | 8.2 |
| Comp. Ex D | 26 | 2.8 | 8 | 9.0 |
| Example 3 | 70 | 1.2 | 13 | 6.5 |
| Comp. Ex E | 39 | 2.3 | 19 | 4.6 |
| Comp. Ex F | 63 | 1.2 | 14 | 5.7 |
| Comp. Ex G | 53 | 1.6 | 6 | 14.6 |
| Comp. Ex H | 52 | 1.5 | — | — |
| Comp. Ex I | 45 | 1.9 | 10 | 9.0 |
| Example 4 | 62 | 1.2 | — | — |
| Comp. Ex J | 55 | 1.4 | — | — |
| Example 5 | 40 | 1.9 | — | — |
| Comp. Ex K | 50 | 1.6 | — | — |
| Comp. Ex L | 48 | 1.6 | — | — |
| Comp. Ex M | 53 | 1.3 | — | — |
| Example 6 | 62 | 1.2 | 17 | 5.0 |

TABLE 1-continued

|  | 1018 MS G-Ratio | 1018 MS % Wear | 304 SS G-Ratio | 304 SS % Wear |
|---|---|---|---|---|
| Comp. Ex N | 41 | 2.2 | 20 | 4.2 |
| Comp. Ex O | 55 | 1.4 | 10 | 8.7 |
| Comp. Ex P | 48 | 1.6 | 9 | 10.1 |

— not tested

Various modifications and alterations of this invention will become apparent to those skilled in the art without departing from the scope and spirit of this invention, and it should be understood that this invention is not to be unduly limited to the illustrative embodiments set forth herein.

What is claimed:

1. An abrasive article comprising:
   a first abrasive grain comprising seeded or nucleated alpha alumina; and a second abrasive grain comprising rare earth oxide or yttria modified alpha alumina.

2. The abrasive article according to claim 1 wherein the first abrasive grain is iron oxide nucleated, and the second abrasive grain is essentially free of a seed or nucleating agent.

3. The abrasive article according to claim 2 which is a cut-off wheel.

4. The cut-off wheel according to claim 3 which has a diameter between 7 and 13 cm.

5. The cut-off wheel according to claim 3 which has a thickness between 1 and 8 mm.

6. The abrasive article according to claim 2 wherein the article is a coated abrasive article.

7. The abrasive article according to claim 2 wherein the article is a structured abrasive article.

8. The abrasive article according to claim 2 wherein the article is a nonwoven abrasive article.

9. The abrasive article according to claim 2 wherein the rare earth oxide modified abrasive grains comprises 0.1–10 wt-% rare earth oxide modifier, based on the total theoretical metal oxide content of the abrasive grain.

10. The abrasive article according to claim 2 wherein the first abrasive grains and the second abrasive grains are present in a weight ratio ranging from 40/60 to 60/40.

11. The abrasive article according to claim 2 wherein the first abrasive grains and the second abrasive grains are present in essentially equal amounts.

12. The abrasive article according to claim 1 wherein the rare earth oxide modified grains are rods.

13. The abrasive article according to claim 2 wherein either of the abrasive grains have an average particle size between about 180 and 800 micrometers.

14. The abrasive article according to claim 2 further comprising fused aluminum oxide grain.

15. The abrasive article according to claim 2 further comprising a filler.

16. The abrasive article according to claim 15 wherein the filler is selected from the group consisting of bubbles, beads, cork, gypsum, marble, limestone, flint, silica, and aluminum silicate.

17. The abrasive article according to claim 2 wherein the first and second abrasive grains are bonded together by an organic bond.

18. The abrasive article according to claim 17 wherein the organic bond is a phenolic bond.

19. The abrasive article according to claim 1 further comprising a grinding aid.

20. The abrasive article according to claim 19 where the grinding aid is selected from the group consisting of cryolite, sodium chloride, $FeS_2$, and $KBF_4$.

* * * * *